United States Patent
Tremblay

(10) Patent No.: US 9,897,153 B2
(45) Date of Patent: Feb. 20, 2018

(54) LOW RADIAL PROFILE BRAKE DISK INSERT RETAINER

(71) Applicant: Goodrich Corporation, Charlotte, NC (US)

(72) Inventor: Nathan Tremblay, Troy, OH (US)

(73) Assignee: Goodrich Corporation, Charlotte, NC (US)

(*) Notice: Subject to any disclaimer, the term of this patent is extended or adjusted under 35 U.S.C. 154(b) by 40 days.

(21) Appl. No.: 14/938,251

(22) Filed: Nov. 11, 2015

(65) Prior Publication Data

US 2017/0130790 A1 May 11, 2017

(51) Int. Cl.
*F16D 65/12* (2006.01)
*B64C 25/42* (2006.01)
*F16D 65/02* (2006.01)

(52) U.S. Cl.
CPC ............ *F16D 65/12* (2013.01); *B64C 25/42* (2013.01); *F16D 65/126* (2013.01); *F16D 2065/1392* (2013.01); *F16D 2065/1396* (2013.01)

(58) Field of Classification Search
CPC .............. F16C 65/126; F16C 2065/136; F16C 2065/1364; F16C 2065/1368; F16C 2065/1392; F16C 2065/1396
See application file for complete search history.

(56) References Cited

U.S. PATENT DOCUMENTS

| | | | | |
|---|---|---|---|---|
| 3,642,101 A | * | 2/1972 | Hauth | F16D 55/32 188/73.38 |
| 3,972,395 A | * | 8/1976 | Jannasch | F16D 55/40 188/218 XL |
| 4,465,165 A | * | 8/1984 | Bok | F16D 65/126 188/218 XL |
| 4,511,021 A | * | 4/1985 | Grider | F16D 65/126 188/218 XL |
| 4,557,356 A | | 12/1985 | Petersen | |
| 5,560,452 A | * | 10/1996 | Labougle | F16D 65/126 188/218 XL |
| 7,766,133 B2 | | 8/2010 | Cress | |

(Continued)

FOREIGN PATENT DOCUMENTS

| | | |
|---|---|---|
| EP | 0115280 | 8/1984 |
| EP | 0161200 | 11/1985 |
| EP | 1988305 | 11/2008 |

(Continued)

OTHER PUBLICATIONS

Extended European Search Report dated May 15, 2017 in European Application No. 16198028.9.

*Primary Examiner* — Bradley T King
*Assistant Examiner* — Stephen M Bowes
(74) *Attorney, Agent, or Firm* — Snell & Wilmer, L.L.P.

(57) ABSTRACT

System and methods for retaining a clip to a rotor are provided. A retainer for retaining a clip to a rotor may have a first end and a second end defining a length between the first end and the second end, the retainer being partially positionable within an opening in the rotor such that at least one of the first end and the second end protrudes axially from the opening at a greater radial location of the rotor than a flange of the clip, the retainer being configured to radially retain the clip to the rotor, the length of the retainer being between 105% and 200% of a width of the rotor at the opening.

9 Claims, 4 Drawing Sheets

(56) References Cited

U.S. PATENT DOCUMENTS

2006/0269766 A1* 11/2006 Swank .................... C22C 38/02
428/469

FOREIGN PATENT DOCUMENTS

| FR | 1140969 | A | * | 8/1957 | ........... | F16D 65/126 |
| FR | 2596833 | A1 | * | 10/1987 | ........... | F16D 65/126 |
| RU | 2093726 | | | 10/1997 | | |
| RU | 2196261 | | | 1/2003 | | |

* cited by examiner

LOW RADIAL PROFILE BRAKE DISK INSERT RETAINER

FIELD

The present disclosure relates generally to brake assemblies and more specifically to systems and methods for retaining a carbon drive lug.

BACKGROUND

Carbon brake disks for aircraft typically use inserts (also referred to as clips) on the drive lugs to increase the strength of the drive lug. "Floating" clip designs use a clip retainer riveted to the carbon to retain the clip in the radial direction, but allow the clip to "float" circumferentially at the disk's outer diameter. The clip retainers add weight and can bow or flex perpendicular to the wear surface of the brake disk due to differences in thermal expansion coefficients.

SUMMARY

Systems and methods for retaining a clip to a rotor are provided. A retainer for retaining a clip to a rotor may have a first end and a second end defining a length between the first end and the second end, the retainer being partially positionable within an opening in the rotor such that at least one of the first end and the second end protrudes axially from the opening at a greater radial location of the rotor than a flange of the clip, the retainer being configured to radially retain the clip to the rotor, the length of the retainer being between 105% and 200% of a width of the rotor at the opening.

In various embodiments, the first end may be configured to engage a first side of the clip and the second end configured to engage a second side of the clip, wherein the first side and the second side are configured to be located on opposite sides of the rotor. An aperture may be disposed in the retainer extending in a radial direction when the retainer is in an installed position. The aperture may be configured to receive a fastener to fasten the retainer to the rotor. The fastener may comprise at least one of a bolt, screw, rod, or flexible tab. The length may be between 110% and 180% of the width of the rotor. The length may be about 140% of the width of the rotor. A width of the retainer may be between 10% and 80% of the length of the retainer. A width of the retainer may be between 20% and 50% of the length of the retainer. A height of the retainer may be between 5% and 100% of the width of the retainer. A height of the retainer may be between 10% and 40% of the width of the retainer. The retainer may comprise at least one of a bar or plate and may comprise a steel alloy.

A clip retaining system may comprise: a rotor having at least one opening extending axially through the rotor; and a retainer comprising a first end and a second end, positionable within the at least one opening such that at least one of the first end and the second end protrude axially from the at least one opening; and a clip having a first flange and a second flange, at least one of the first flange and the second flange being configured to extend perimetrically radially inwardly of the first end or the second end of the retainer to thereby be radially retained to the rotor by the retainer.

In various embodiments, the clip retainer system may further comprise a fastener, wherein an aperture is disposed in the retainer, the aperture extending in a radial direction when the retainer is in an installed position, the fastener configured to be inserted into the aperture to fasten the retainer to the rotor. The fastener may comprise at least one of a bolt, screw, rod, or flexible tab. The first end may be configured to engage a first side of the clip and the second end configured to engage a second side of the clip, wherein the first side and the second side are configured to be located on opposite sides of the rotor. The clip may include a flange and a radially inward surface of the retainer may be configured to engage the flange to prevent the clip from moving radially. The retainer may comprise a steel alloy.

A method for retaining a clip to a rotor may comprise: positioning the clip relative to the rotor; and inserting a retainer at least partially into an opening disposed in the rotor such that a portion of the retainer extends axially beyond the opening, the portion of the retainer being located radially outward of a flange of the clip.

In various embodiments, the method may further comprise inserting a fastener into an aperture disposed in the retainer, the aperture extending in a radial direction when the retainer is in an installed position.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

In various embodiments, a metal rotor clip may be held in place to a carbon rotor brake disk to prevent the rotor clip from falling away from the rotor during assembly. An aperture may be drilled radially into the carbon rotor brake disk to accept a fastener. A retainer may be inserted into a slot disposed in the carbon rotor brake disk. The fastener may be accepted by an aperture disposed in the retainer to fasten the retainer to the carbon rotor brake disk.

Figure 1:
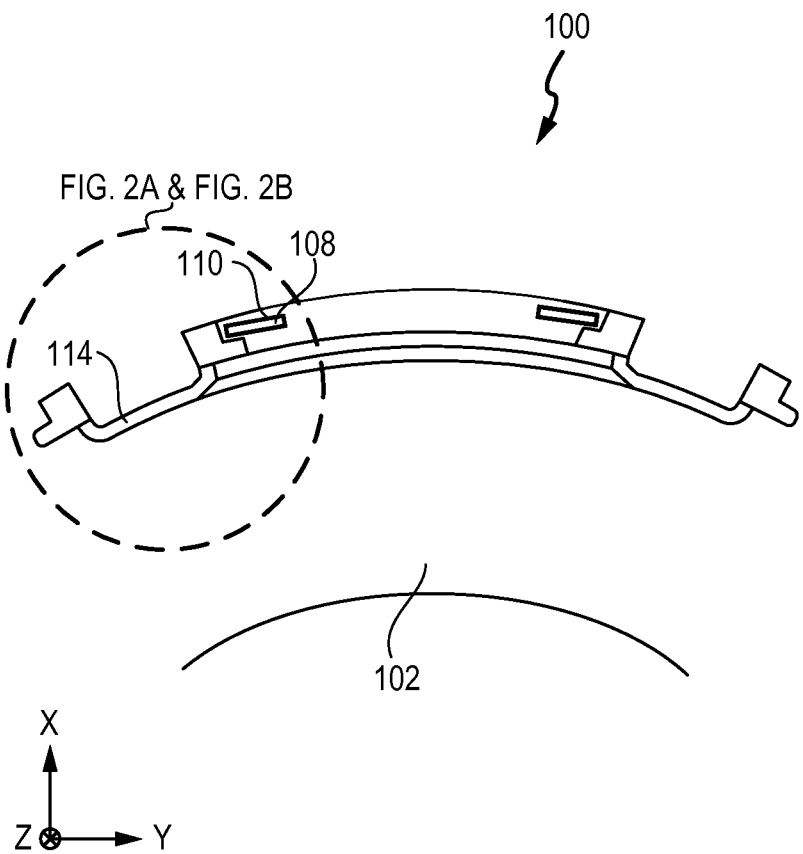
FIG. 1 illustrates, in accordance with various embodiments, a brake disk assembly.

With reference to FIG. 1, a carbon brake disk assembly 100 is illustrated, in accordance with various embodiments. Carbon brake disk assembly 100 may include a carbon rotor disk (also referred to herein as a rotor) 102, at least one clip (also referred to herein as rotor clip) 114, and at least one retainer 108. Rotor clip 114 may be coupled to a radially outward portion of rotor 102 when in an installed position. Retainer 108 may be located inside of slot 110 when in an installed position. Slot 110 may extend in an axial direction (in the z-direction).

Figure 2A:
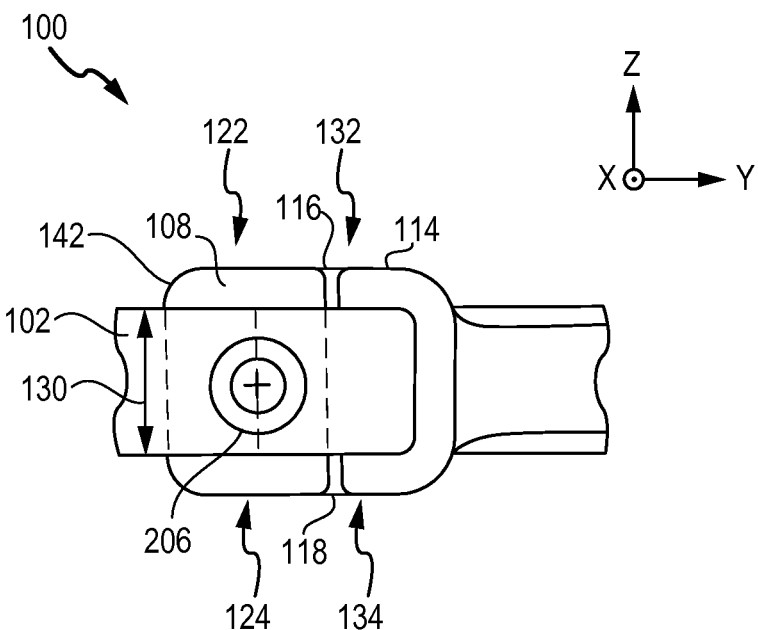
FIG. 2A illustrates, in accordance with various embodiments, a radial view of a retainer in an installed position.

With reference to FIG. 2A, a radial view of a retainer 108 in an installed position is illustrated, in accordance with various embodiments. An xyz axes is provided for ease of illustration. Retainer 108 may comprise a first end 122 and a second end 124. Rotor clip 114 may comprise a first side 132 and a second side 134. First end 122 of retainer 108 may engage first side 132 of rotor clip 114. Second end 124 of retainer 108 may engage second side 134 of rotor clip 114. First end 122 and second end 124 may be located on opposite sides of rotor 102 when retainer 108 is in an installed position. First side 132 and second side 134 may be located on opposite sides of rotor 102 when rotor clip 114 is in an installed position. First side 132 and second side 134 may protrude axially (z-direction) from slot 110 (see FIG. 2B) when retainer 108 is in an installed position. In various embodiments, fastener 206 may extend in the radial direction (x-direction) when in an installed position. In various embodiments, retainer 108 may comprise a first fillet 142. In various embodiments, rotor clip 114 may comprise a first flange 116 and a second flange 118. In various embodiments, first flange 116 may be located on first side 132 and second flange 118 may be located on second side 134.

Figure 3:
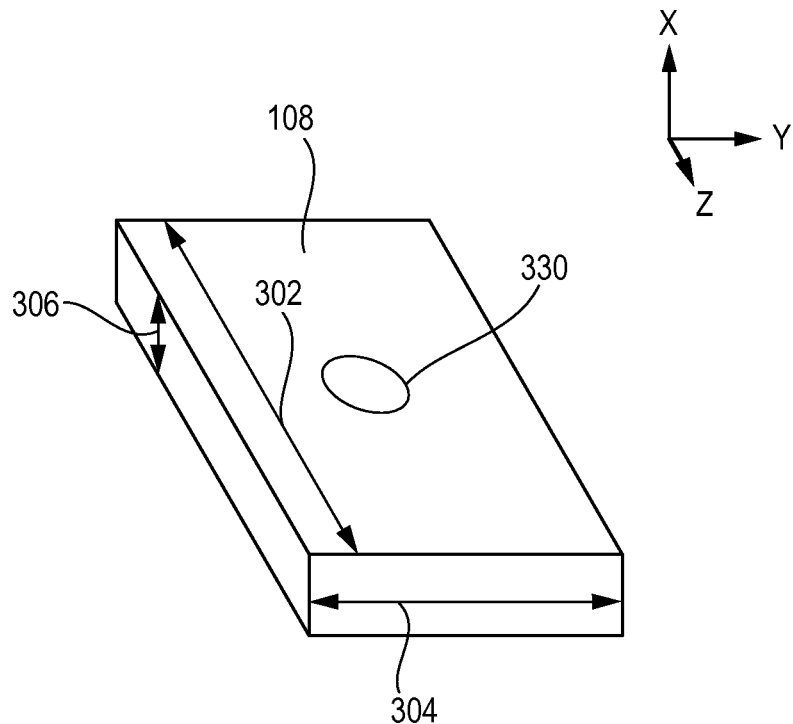
FIG. 3 illustrates, in accordance with various embodiments, a retainer.

In various embodiments, rotor 102 may comprise a width 130. With further reference to FIG. 3, retainer 108 may comprise length 302, a width 304, and a height 306. In various embodiments, retainer 108 may comprise a length 302 of between 105% and 200% of width 130 of the rotor 102. In various embodiments, retainer 108 may comprise a length 302 of between 110% and 180% of width 130 of the rotor 102. In various embodiments, retainer 108 may comprise a length 302 of about 140% of width 130 of the rotor 102, wherein "about" in this context may be ±5%.

In various embodiments, retainer 108 may comprise a width 304 of between 10% and 80% of length 302 of retainer 108. In various embodiments, retainer 108 may comprise a width 304 of between 20% and 50% of length 302 of retainer 108.

In various embodiments, retainer 108 may comprise a height 306 of between 5% and 100% of width 304 of retainer 108. In various embodiments, retainer 108 may comprise a height 306 of between 10% and 40% of width 304 of retainer 108.

In various embodiments, retainer 108 may include an aperture 330 disposed in retainer 108. Aperture 330 may extend in the radial direction (x-direction) when retainer 108 is in an installed position.

Figure 2B:
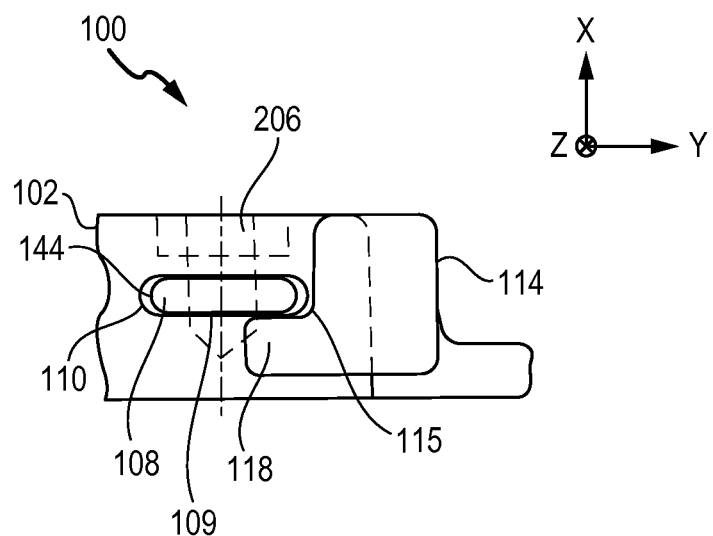
FIG. 2B illustrates, in accordance with various embodiments, an axial view of a retainer in an installed position.

With reference to FIG. 2B, an axial view of a retainer 108 in an installed position is illustrated, in accordance with various embodiments. An xyz axes is provided for ease of illustration. In various embodiments, retainer 108 may comprise a second fillet 144. In various embodiments, retainer 108 may comprise a rectangular plate. In various embodiments, retainer 108 may comprise a rectangular plate having rounded edges as illustrated, at least in part, by first fillet 142 (see FIG. 2A) and second fillet 144. However, it is contemplated that retainer 108 may comprise any suitable geometry such as a cylindrical geometry (i.e, a bar or rod), a square geometry, or any other geometry.

As previously mentioned, fastener 206 may extend in the radial direction (x-direction) when in an installed position. Fastener 206 may extend through aperture 330 (see FIG. 3) of retainer 108 when in an installed position. Thus, aperture 330 may be configured to receive fastener 206. In various embodiments, fastener 206 may be threadingly attached to retainer 108 via aperture 330. In various embodiments, fastener 206 may comprise a flexible tab configured to compress in order to pass through aperture 330 and configured to expand after passing through aperture 330 to retain fastener 206 to retainer 108. In various embodiments, fastener 206 may comprise a screw, bolt, or the like. Accordingly, fastener 206 may fasten retainer 108 to rotor 102. Fastener 206 and retainer 108 may be referred to collectively herein as a retaining system.

In various embodiments, retainer 108 may be configured to radially retain rotor clip 114. Stated another way, retainer 108 may prevent rotor clip 114 from moving radially outward (x-direction). Radially inward surface 109 of retainer 108 may be configured to engage first flange 116 (see FIG. 2A) and second flange 118 of rotor clip 114 to perimetrically radially retain rotor clip 114. First flange 116 and second flange 118 may extend away (negative y-direction) from rotor clip 114. First flange 116 and second flange 118 may generally comprise an "L" shape. A fillet 115 may be located on second flange 118. Likewise, a fillet may be located on first flange 116. In various embodiments, fillet 115 may comprise a rounded portion. Fillet 115 may be substituted for a chamfer or the like.

In various embodiments, retainer 108 may comprise a steel alloy. Retainer 108 may comprise a metal, such as stainless steel, an austenitic nickel-chromium-based alloy such as Inconel™ which is available from Special Metals Corporation of New Hartford, N.Y., USA, titanium, and other suitable materials. Retainer 108 may comprise a material configured to resist high temperatures of up to 2000° F. Retainer 108 may be manufactured using metal laser sintering, casting, an additive manufacturing process, stamping sheet metal or the like.

Figure 4:
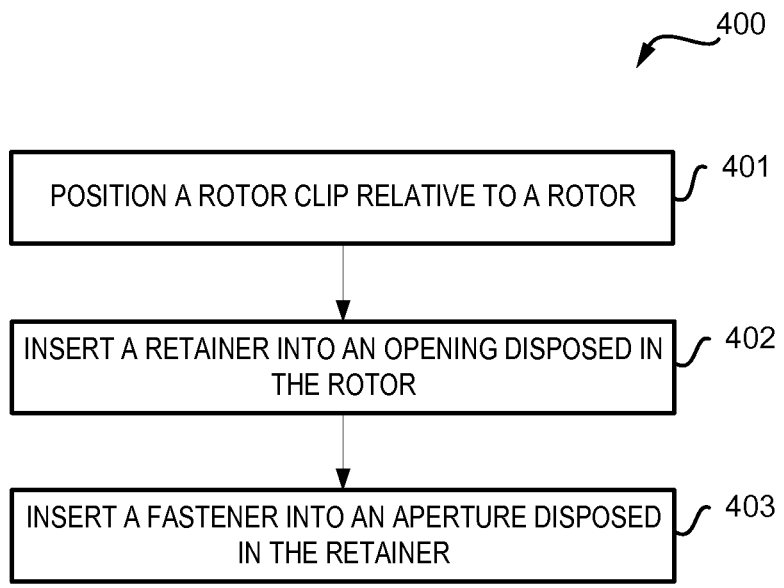
FIG. 4 illustrates, in accordance with various embodiments, a method for retaining a clip to a rotor.

With reference to FIG. 4, a method 400 for retaining a clip to a rotor is provided, in accordance with various embodiments. Method 400 may include positioning a rotor clip relative to a rotor (see step 401). Method 400 may include inserting a retainer into an opening disposed in the rotor (see step 402). Method 400 may include inserting a fastener into an aperture disposed in the retainer.

With further reference to FIG. 2B, method 400 may include positioning rotor clip 114 relative to rotor 102 (see step 401). Rotor clip 114 may be positioned relative to rotor 102 by setting rotor clip 114 over rotor 102. Method 400 may include inserting retainer 108 at least partially into slot 110 disposed in the rotor 102 (see step 402), the retainer 108 located radially outward (positive x-direction) from the rotor clip 114 and the slot 110 extending in an axial direction (z-direction). Method 400 may further include inserting a fastener 206 into an aperture 330 (see FIG. 3) disposed in the retainer 108 (see step 403), the aperture 330 extending in a radial direction (x-direction).

Figure 5A:
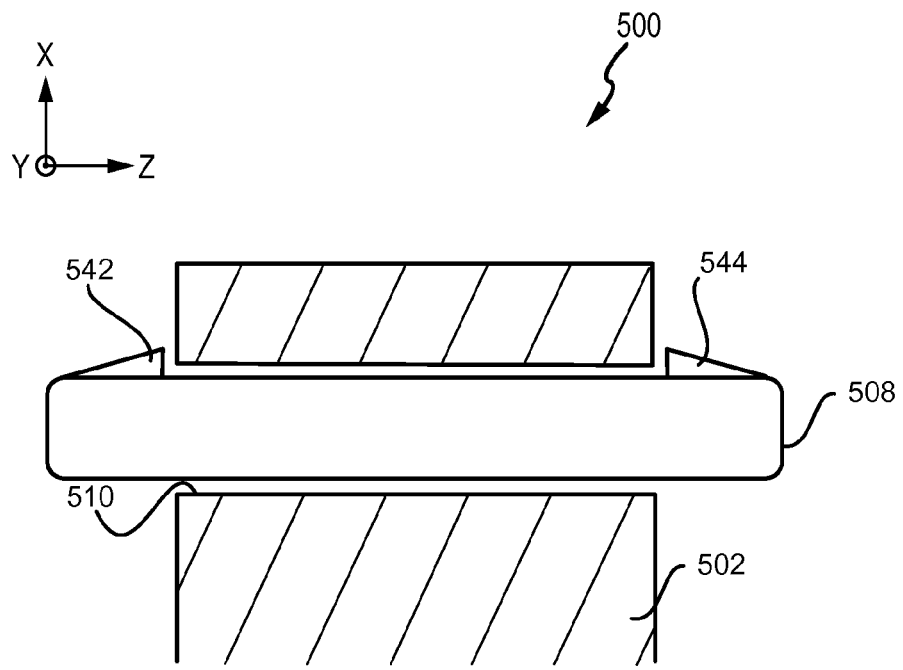
FIG. 5A illustrates, in accordance with various embodiments; a cross-section view of a carbon brake disk assembly with a retainer including one or more flexible tabs in an installed position.

With reference to FIG. 5A, a cross-section view of a carbon brake disk assembly (assembly) 500 with a retainer 508 including one or more flexible tabs. An xyz axes is provided for ease of illustration. Carbon brake disk assembly 500 may be similar to carbon brake disk assembly 100 of FIG. 1 through FIG. 2B. In various embodiments, assembly 500 may include retainer 508 and carbon rotor disk (also referred to herein as a rotor) 502. Retainer 508 may include one or more tabs 542, 544. In various embodiments, tab 542 may be a flexible tab. In various embodiments, tab 544 may be a flexible tab. In various embodiments, tab 542 may be configured to flex towards retainer 508 (in the negative x-direction) to allow retainer 508 to be inserted into slot 510. Tab 542 may be configured to prevent retainer 508 from sliding axially (z-direction). Tab 542 may engage rotor 502 in response to retainer 508 moving in an axial direction to prevent retainer 508 from moving in that axial direction. In various embodiments, retainer 508 may comprise one flexible tab and one fixed tab. For example, tab 542 may comprise a flexible tab and tab 544 may comprise a fixed tab.

Figure 5B:
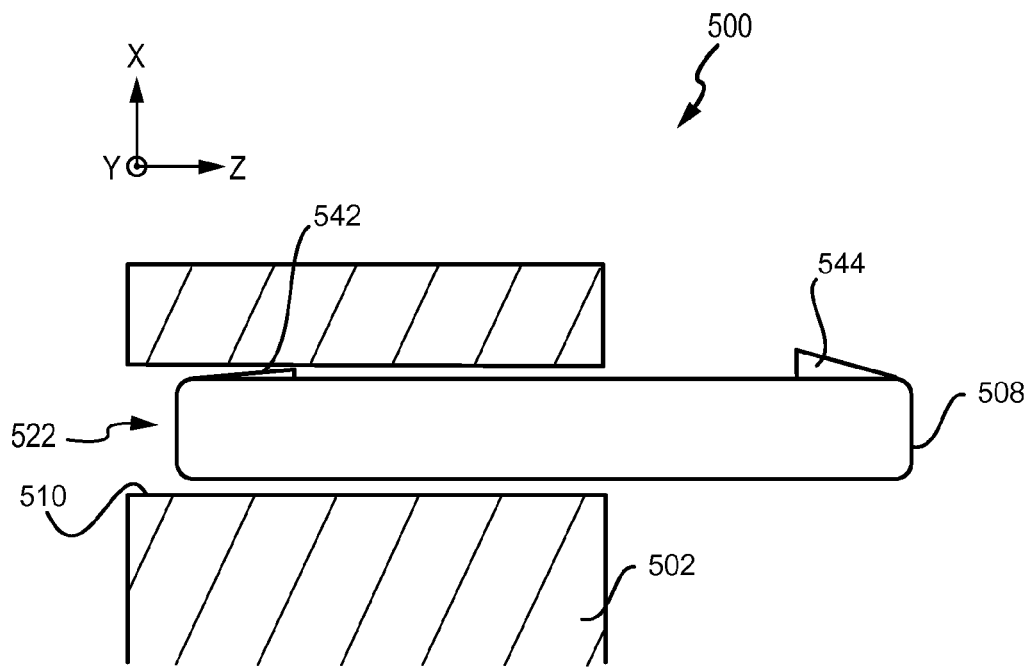
FIG. 5B illustrates, in accordance with various embodiments, a cross-section view of a carbon brake disk assembly with a retainer including one or more flexible tabs being inserted into a slot of a rotor.

With reference to FIG. 5B, a cross-section view of assembly 500 with retainer 508 including one or more flexible tabs being inserted into a slot 510 of rotor 502. In various embodiments, in order to position retainer 508 at least partially within slot 510, tab 542 may be depressed to allow first end 522 of retainer 508 to slide through slot 510 as illustrated in FIG. 5B. Accordingly, retainer 508 may be installed or uninstalled by depressing tab 542 and pushing or pulling retainer 508 in the positive z-direction through slot 510 as illustrated in FIG. 5B.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A clip retaining system comprising:
   a rotor having at least one opening extending axially through the rotor; and
   a retainer comprising a first end and a second end, positionable within the at least one opening such that at least one of the first end and the second end protrude axially from the at least one opening;
   a clip having a first flange and a second flange, at least one of the first flange and the second flange being configured to extend perimetrically radially inwardly of the first end or the second end of the retainer to thereby be radially retained to the rotor by the retainer in response to a radially inward surface of the retainer directly engaging at least one of the first flange and the second flange, wherein the clip is positioned in a recess of the rotor, the recess being located circumferentially from the opening;
   an aperture disposed in the retainer, a centerline axis of the aperture extending in a radial direction when the retainer is in an installed position; and
   a fastener extending into the aperture whereby the retainer is fastened to the rotor.

2. The clip retaining system of claim 1, wherein the first end is configured to engage a first side of the clip and the second end configured to engage a second side of the clip, wherein the first side and the second side are configured to be located on opposite sides of the rotor.

3. The clip retaining system of claim 1, wherein the clip includes a flange and a radially inward surface of the retainer is configured to engage the flange to prevent the clip from moving radially.

4. The clip retaining system of claim 1, wherein the retainer comprises a steel alloy.

5. A method for retaining a clip to a rotor comprising:
   positioning the clip at least partially into a recess of the rotor; and
   inserting a retainer at least partially into an opening disposed in the rotor, the opening located circumferentially from the recess, such that a portion of the retainer extends axially beyond the opening, the portion of the retainer being located radially outward of a flange of the clip and the flange of the clip being radially retained to the rotor by the retainer.

6. The method of claim 5, further comprising inserting a fastener into an aperture disposed in the retainer, the aperture extending in a radial direction when the retainer is in an installed position.

7. A clip retaining system comprising:
a rotor having at least one opening extending axially through the rotor; and
a retainer comprising a first end and a second end, positionable within the at least one opening such that at least one of the first end and the second end protrude axially from the at least one opening; and
a clip having a first flange and a second flange, at least one of the first flange and the second flange being configured to extend perimetrically radially inwardly of the first end or the second end of the retainer to thereby be radially retained to the rotor by the retainer in response to a radially inward surface of the retainer directly engaging at least one of the first flange and the second flange, wherein the clip is positioned in a recess of the rotor, the recess being located circumferentially from the opening.

8. The clip retaining system of claim 7, wherein the retainer includes a tab configured to prevent the retainer from moving in relative to the opening.

9. The clip retaining system of claim 8, wherein the tab is flexible.

\* \* \* \* \*